United States Patent
Frank et al.

(10) Patent No.: US 9,728,313 B2
(45) Date of Patent: Aug. 8, 2017

(54) DEVICE FOR COOLING A SUPERCONDUCTING MACHINE

(71) Applicant: Siemens Aktiengesellschaft, Munich (DE)

(72) Inventors: Michael Frank, Uttenreuth (DE); Peter Van Haβelt, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 128 days.

(21) Appl. No.: 14/368,366

(22) PCT Filed: Dec. 12, 2012

(86) PCT No.: PCT/EP2012/075195
§ 371 (c)(1),
(2) Date: Jun. 24, 2014

(87) PCT Pub. No.: WO2013/110403
PCT Pub. Date: Aug. 1, 2013

(65) Prior Publication Data
US 2015/0007587 A1     Jan. 8, 2015

(30) Foreign Application Priority Data

Jan. 26, 2012    (DE) .................. 10 2012 201 108

(51) Int. Cl.
*F17C 13/00*      (2006.01)
*H01F 6/04*      (2006.01)
(Continued)

(52) U.S. Cl.
CPC ............... *H01F 6/04* (2013.01); *F17C 13/00* (2013.01); *F25D 11/00* (2013.01);
(Continued)

(58) Field of Classification Search
CPC ..... F17C 13/006; F17C 13/007; H02K 55/04; F25B 2400/17; F28D 15/0266
See application file for complete search history.

(56) References Cited

U.S. PATENT DOCUMENTS 4,314,459 A * 2/1982 Rivoire .................. F17C 13/026
165/263
4,355,522 A    10/1982 Gorski
(Continued)

FOREIGN PATENT DOCUMENTS

CN      100555823 C     10/2009
DE      442457 C     3/1927
(Continued)

OTHER PUBLICATIONS

JP2008043938 Translation.*
(Continued)

*Primary Examiner* — Frantz Jules
*Assistant Examiner* — Brian King
(74) *Attorney, Agent, or Firm* — Harness, Dickey & Pierce, P.L.C.

(57) ABSTRACT

A device for cooling a superconducting machine is disclosed, including a storage vessel which receives condensed coolant and from which the coolant can be fed via a pipe to the machine, wherein the storage vessel has a storage region and an evaporator region, which is separated from the former, with a heat source which continuously has a temperature above the boiling point of the coolant. The evaporator region is connected via a curved overflow pipe to the storage region in such a way that, when a defined coolant filling level is reached in the storage region, coolant flows via the overflow pipe automatically into the evaporator region and evaporates there.

17 Claims, 2 Drawing Sheets

(51) Int. Cl.
*H02K 55/04* (2006.01)
*F28D 15/02* (2006.01)
*F25D 11/00* (2006.01)

(52) U.S. Cl.
CPC ......... *F28D 15/0266* (2013.01); *H02K 55/04* (2013.01); *Y02E 40/625* (2013.01)

(56) References Cited

U.S. PATENT DOCUMENTS

| | | | | |
|---|---|---|---|---|
| 4,872,314 | A * | 10/1989 | Asano | F17C 13/02 174/15.4 |
| 5,473,907 | A * | 12/1995 | Briggs | F24D 5/12 62/238.7 |
| 7,528,510 | B2 | 5/2009 | Frank et al. | |
| 8,117,851 | B2 * | 2/2012 | Sugawara | F17C 7/00 62/48.1 |
| 2005/0229609 | A1 * | 10/2005 | Kirichek | F25B 9/02 62/6 |
| 2007/0095075 | A1 | 5/2007 | Frank | |
| 2013/0165325 | A1 | 6/2013 | Frank | |

FOREIGN PATENT DOCUMENTS

| | | |
|---|---|---|
| DE | 102010041194 | 3/2012 |
| JP | H02238117 A | 9/1990 |
| JP | 8189715 A | 7/1996 |
| JP | 2751337 B2 | 5/1998 |
| JP | 2008043938 A | 2/2008 |
| WO | WO 2008010319 A1 | 1/2008 |

OTHER PUBLICATIONS

Chinese Office Action and English translation thereof dated Dec. 17, 2015.
International Search Report PCT/ISA/210 for International Application No. PCT/EP2012/075195 Dated May 27, 2014.
Written Opinion of the International Searching Authority PCT/ISA/237 for International Application No. PCT/EP2012/075195 dated May 27, 2014.
German Office Action dated Oct. 2, 2012.
Office Action for Chinese Patent Application No. 201280067987.8 issued on Aug. 5, 2016 and English language translation thereof.

* cited by examiner

DEVICE FOR COOLING A SUPERCONDUCTING MACHINE

This application is the national phase under 35 U.S.C. §371 of PCT International Application No. PCT/EP2012/075195 which has an International filing date of Dec. 12, 2012, which designated the United States of America, and which claims priority to German patent application number DE 102012201108.0 filed Jan. 26, 2012, the entire contents of each of which are hereby incorporated herein by reference.

FIELD

At least one embodiment of the invention generally relates to a device for cooling a superconducting machine, comprising a storage vessel accommodating a condensed coolant, from which the coolant is able to be supplied to the machine via a pipe.

BACKGROUND

Superconducting machines generally comprise superconducting coils which have to be reliably cooled, at least during the operation of the machine. Depending on the superconductor material used, different cooling temperatures are required, wherein materials with critical temperatures Tc of over 77 K have also been known for some considerable time. These materials are also referred to as high-Tc superconductor materials or HTS materials. Liquid nitrogen, liquid neon or especially liquid helium can be used as the coolant. This coolant is to be brought into contact with the winding or with its thermally-conductive support structure in order to cool the superconducting winding.

Because of mostly technical boundary conditions it is sometimes necessary, when cooling the winding, to transport the coolant against the force of gravity, thus to convey it from a lower position to a machine positioned higher up. This transport of the liquid coolant can be undertaken by way of mechanically-driven pumps, by way of bubble pumps or by an overpressure either applied from outside or created by evaporation of coolant. Mechanically-driven pumps are very maintenance-intensive, heat is generated during their operation, wherein the heat being introduced into the coolant must be avoided, and also the lifetime of such pumps is problematic. Bubble pumps avoid these disadvantages in part but are restricted in their pumping power through their function depending on the driving of a gas bubble in the coolant. The possible diameter of the riser pipe is restricted, as is also the rise height and the pump speed.

The transport of the coolant by way of overpressure is technically advantageous. For this purpose either controlled pumps and valves for the hot gas (in the event of the overpressure being applied from outside) or controllers, heaters etc are needed for the generation of the overpressure by evaporation. All these active components however conceal the risk of outages and in addition mean a not-insignificant additional outlay for the overall system.

A device which operates with separately-activated, time-modulated heating devices is known from DE 10 2010 041 194. In the device, a number of condenser chambers are each provided with one assigned cooling head, which are connected fluidically in each case via connecting lines with a joint evaporator chamber provided on the machine side. Each condenser chamber has a separate heating device. If coolant is to be conveyed from a condenser chamber via the connecting line to the evaporator chamber, the heating device of the respective condenser chamber involved is switched in, so that a temperature is set which is used for evaporating the coolant. This expands in the condenser chamber, resulting in an increase in pressure, through which the liquid coolant which is located in the connecting line to the evaporator chamber is pressurized in said chamber. The individual heating devices of the separate condenser chambers are switched on, modulated over time; they are thus operated successively offset in time to one another. The evaporation of the coolant thus occurs in the condenser chamber itself via the heating device assigned to the chamber.

SUMMARY

An embodiment of the invention specifies a cooling device constructed as a simple design which makes it possible in a simple manner to create an overpressure by evaporating coolant.

In accordance with at least one embodiment of the invention, a storage vessel includes a storage region and an evaporator region separated therefrom, with a heat source having a temperature continuously above the boiling temperature of the coolant, which is connected via a curved overflow pipe to the storage region such that, when a specific coolant fill level in the storage region is reached, coolant automatically flows via the overflow pipe into the evaporator region and evaporates there.

BRIEF DESCRIPTION OF THE DRAWINGS

Further advantages, features and details of the invention emerge from the exemplary embodiments described below and with reference to the drawings, in which.

DETAILED DESCRIPTION OF THE EXAMPLE EMBODIMENTS

Figure 1:
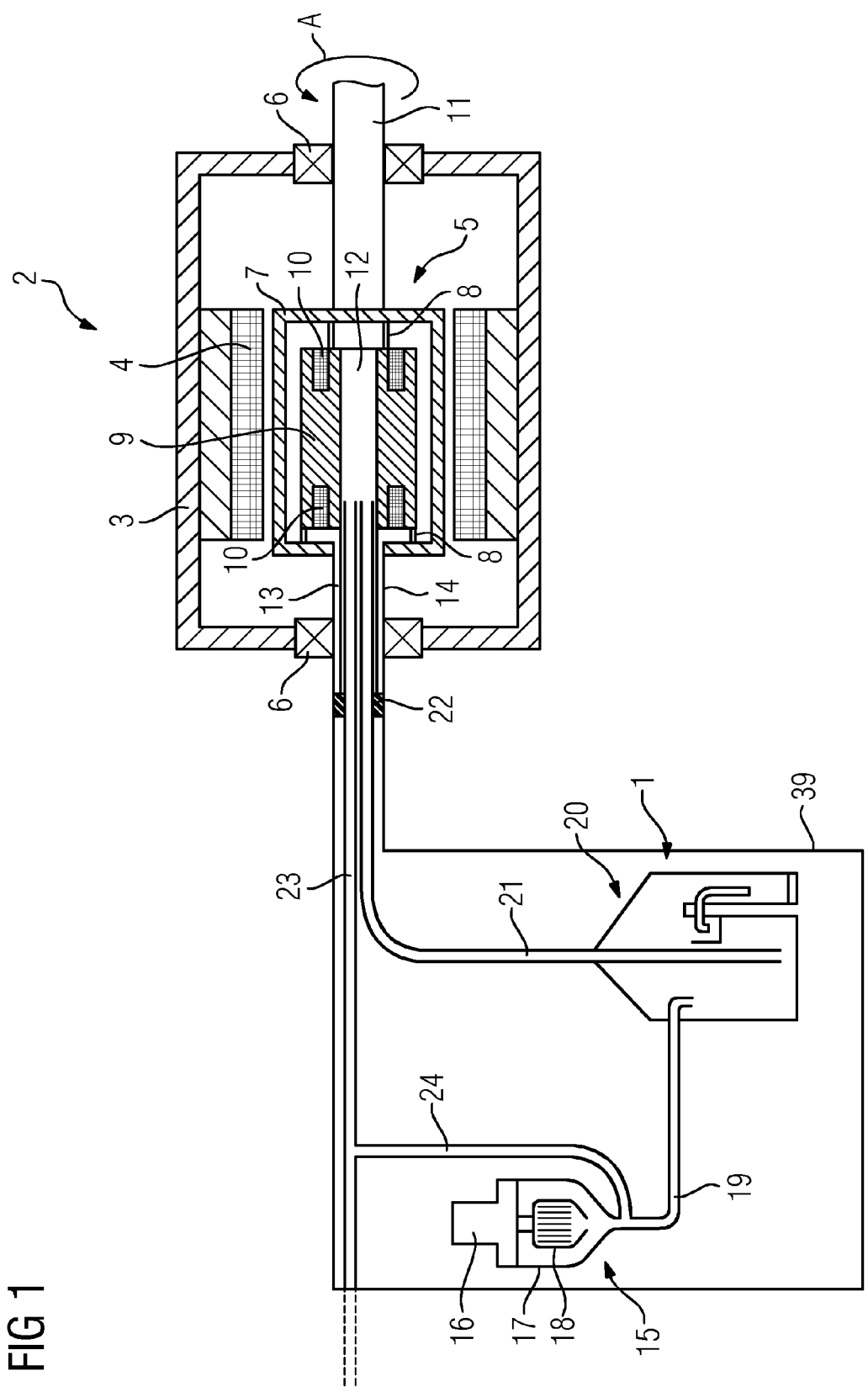
FIG. 1 shows a schematic diagram of an embodiment of an inventive device with assigned condensation device and the machine to be cooled.

In accordance with at least one embodiment of the invention, a storage vessel includes a storage region and an evaporator region separated therefrom, with a heat source having a temperature continuously above the boiling temperature of the coolant, which is connected via a curved overflow pipe to the storage region such that, when a specific coolant fill level in the storage region is reached, coolant automatically flows via the overflow pipe into the evaporator region and evaporates there.

In at least one embodiment of the inventive device, the condensing device, which is used for condensing the gaseous coolant fed back from the machine, i.e. the condenser, has a separate storage vessel connected downstream from it. This storage vessel is designed in two parts. It has a storage region in which the condensed coolant coming from the condenser mostly in the form of drops collects. An evaporator region is provided arranged alongside the storage region, but connected atmospherically to it however. The region is assigned a heat source which continuously has a temperature above the boiling temperature of the fluid coolant. This heat source is not modulated.

The evaporator region is initially empty. The condensed coolant collects exclusively in the storage region. Over time the level of the coolant there rises. If the coolant fill level reaches a defined level, then coolant flows out of the storage region via a curved overflow pipe, which connects the storage region with the evaporator region, into the evaporator region where it evaporates. By the evaporation, depending on the evaporation, an overpressure is set in the storage region communicating with the evaporator region, which causes the coolant located in the storage region to be conveyed via the pipe leading to the machine, which is embodied as a riser pipe. The riser pipe extends to the machine arranged above the device or rather especially above the storage vessel, the liquid coolant can be readily conveyed via the overpressure to the machine via the riser pipe.

The central element is the curved overflow pipe, which acts as a suction lift, thus making the automatic overflow possible if the fill level in the storage region has risen far enough to rise above the apex of the overflow pipe. This automatic coolant flow occurs until the level on the input side, i.e. in the storage region, falls below the inlet opening of the overflow pipe again. This thus makes it possible within a very short time to convey a significant volume automatically from the storage region into the evaporator region, where it immediately evaporates, so that in a very short time a significant overpressure can be built up.

At least one embodiment of the inventive device consequently allows a very simple conveyance of a defined volume of coolant from the storage region into the evaporator region. In addition modulated heating is not required, instead a continuous temperature control of the evaporator region is provided.

The overflow pipe is curved in a U shape in accordance with an advantageous development and is disposed in a reversed U-arrangement with a suction arm in the storage region and an outlet arm in the evaporator region. The volume, which is sucked in automatically from the storage region into the evaporator region when the predetermined coolant level is reached is ultimately defined via the length of the suction arm or the height difference between the inlet opening on the suction arm and the apex of the overflow pipe.

The storage region is preferably separated from the evaporator region via a partition wall which merely separates the two regions from one another fluidically and thermally, but not atmospherically however. This is because it must be ensured that, by evaporation of the coolant in the evaporator region, an overpressure can also be set in the storage region, where the coolant to be conveyed is present. The apex point of the overflow pipe is positioned so that it lies below the upper edge of the partition wall separating the storage region from the evaporator region.

As described, the volume of coolant automatically sucked out of the storage region depends on the distance between the suction opening of the suction arm and the apex of the overflow pipe. This distance should amount to one centimeter, preferably to several centimeters in order to be able to convey a sufficient volume of coolant into the evaporator region and evaporate it.

Sometimes it can occur that the entire system, including the inventive device and the machine which is to be continuously cooled, moves, especially during transport on a ship for example. An inclination of the ship leads to an inclination movement of the device as well, which results in an inclination of the coolant level, meaning that the level position also changes. If such a change occurs precisely at the moment in which the sucking-out process has begun, this can result in only a relatively small volume being sucked out, since as a result of the movement, the overflow pipe changes its position relative to the coolant level.

Also it is naturally conceivable that as a result of the variation, despite a sufficient fill level in the storage vessel, no sucking out takes place since, as a result of the position, the coolant level simply does not reach the apex of the overflow pipe. To counteract this, an especially advantageous development of the invention makes provision for an overflow region to be separated off by way of an overflow wall in the storage region, into which coolant overflows and from which, when a specific fill level is reached, coolant runs via the overflow pipe into the evaporator region.

In this embodiment of the invention a separate overflow region is again separated off in the storage region. A suitable wall construction is provided for this purpose. Liquid coolant coming from the condenser collects in the storage region and rises over the course of time. If the fill level is high enough for the upper edge of the overflow wall to be reached, the coolant also runs successively into the overflow region. The overflow pipe with its suction arm also protrudes into this region. If on correct positioning of the device the specific fill level is reached in the overflow region, this results in automatic suction of the defined volume of coolant located in the overflow region. There is no suction from the remainder of the storage region, since this is prevented via the overflow wall.

If a relative movement of the device now occurs beforehand or during the suction, this only has a marginal effect on the fill level or coolant level in the overflow region, since this region is only a very limited region which is thus far smaller than the storage region in which, as a result of its size, a change in position has a considerably greater effect on the coolant level position than in the small overflow region. This means that the height of the coolant level in the storage region consequently has a far lower influence on the amount of coolant transported into the heated evaporator region.

The heat source which is assigned to the evaporator region can be a heater, especially a resistive heater, which is operated continuously and merely has to be held at a temperature which is above the boiling temperature of the coolant.

As an alternative to this, the heat source can also be a wall surface, especially the floor surface of the evaporator region, which wall surface in the assembled position is in thermal contact with a third object having a temperature far above the boiling temperature of the coolant. This particularly expedient embodiment of the invention dispenses completely with an additional heater, but uses the situation that a third object is generally adjacent to the storage region or to the evaporator region in the installed position, which possesses an inherent temperature generally far above the boiling temperature of the coolant, which generally is in the range of a few Kelvin. If a wall surface of the evaporator region, preferably its floor surface, is now brought into thermal contact with this third object, for example by the two being directly adjacent to one another, or via a thermally-conductive component which is connected between them, the evaporator region can readily be continuously temperature-controlled and the evaporation ensured.

Although it is occasionally sufficient to provide just one storage vessel in order to cool the machine sufficiently, it is however conceivable that, especially with large machines, a correspondingly high cooling power is to be provided. For this purpose it can be necessary to provide a number of storage vessels each with separate pipes embodied as riser lines. These riser lines can now be routed either separately to the machine and open out into the evaporator region, for which correspondingly sealed through-connections are to be provided in the vacuum region surrounding the evaporator region or the superconducting windings. However it is also conceivable to let the riser lines open out into a common feed line running to the machine, which is advantageous to the extent that only this one feed line has to be routed sealed into the machine.

If a number of storage vessels are used, each storage vessel can be assigned its own condensation device for condensing the gaseous coolant coming from machine, i.e. each storage vessel has its own assigned condenser. As an alternative however it is also conceivable for the storage vessels to be assigned to a common condensation device, via which all storage regions are filled, if necessary controlled by suitable valves connected between the two devices.

FIG. 1 shows an embodiment of an inventive device 1, which will be explained in greater detail below. It is used for cooling and thus operating a rotating machine 2 shown here, having a fixed outer housing 3 which is at room temperature with a stator winding 4 (naturally a static machine can also be provided). Within the outer housing and surrounded by the stator winding 4, a rotor 5 is supported rotationally around an axis of rotation, as is shown by the arrow A. The rotor 5 is rotationally supported in bearings 6. It has a vacuum housing 7 in which a winding carrier 9 with an HTS winding 10 is held for example on hollow-cylindrical, torque-transmitting suspension elements 8. In this winding carrier a cavity 12 concentric to the axis of rotation extending in the axial direction is present, which for example has a cylindrical shape. The winding carrier 9 in this case is embodied vacuum-sealed against this cavity 12. It closes this off on one side of the rotor, which on this side is supported by means of a massive axial rotor shaft part 11.

On the opposite side the central cavity 12 is connected to a lateral cavity 13. This lateral cavity 13 leads out from the outer housing 3 from the area of the winding carrier 9, for which corresponding supply lines and output lines described below are used. A tubular rotor shaft part surrounding this lateral cavity 13 supported in a bearing 6 is labeled with the number 14. The basic structure of such a machine operating with superconducting windings is basically known and there is no need to discuss it in greater detail.

For the indirect cooling of the HTS winding via thermally-conductive parts the inventive device 1 is provided, which has a condensing device 15, i.e. a condenser, connected upstream of it. This condensing unit comprises a cooling head 16, which can involve for example a Gifford-McMahon-type cryocooler or in particular a regenerative cryocooler such as for example a pulse tube cooler or a split-Stirling cooler. The cooling part of the cooling head 16 is located in a vacuum vessel 17 in contact with a condensation unit 18, where gaseous coolant coming from the machine condenses. The condensed coolant flows via a feed line 19 to an embodiment of the inventive device 1, a process which will be further discussed below.

An embodiment of the inventive device 1 comprises a storage vessel 20 from which a pipe 21 in the form of a riser line leads to the machine. The pipe 21 is sealed via a suitable sealing device 22 in the cavity 13 and is routed onwards into the cavity 12. Via the pipe 21 condensed coolant from the storage vessel 20 can be conveyed via an overpressure created in said vessel into the cavity 12. There it evaporates, i.e. accepts heat from the winding carrier 9 surrounding the cavity or from the superconducting HTS windings 10 to be cooled. The evaporated, gaseous coolant is then conveyed away via a further line 23 which exits from the cavity 12 and once again is routed out of the machine sealed via the sealing device 22 and in the example shown is routed via a branch line 24 to the condensation device 15. Shown by way of example is the option of lengthening the line 23 in order, via said line, also to feed one or more further condensation devices 15 as well as assigned separate devices, wherein each further device 1, in a manner corresponding to that shown for the device 1, is connected via a pipe 21 to the cavity 12.

In the closed circuit, formed by an embodiment of the inventive device 1, the cavities 12 and 13 of the machine 2 as well as the line system comprising the lines 23, 24 and the condensation device 15, a coolant (fill volume, e.g. 1 l or more) is present, which serves to cool the superconducting HTS windings 10. This coolant can for example be helium (condensation temperature 4.2 K at normal pressure), hydrogen (condensation temperature 20.4 K at normal pressure), neon (condensation temperature 27.1 K at normal pressure), nitrogen (condensation temperature 77.4 K at normal pressure) or argon (condensation temperature 87.3 K at normal pressure). Mixtures of these gases are also considered. This coolant condenses in the condensation device 15 and as described, is supplied via the lines 19 to the storage vessel 20, see also FIG. 2.

Figure 2:
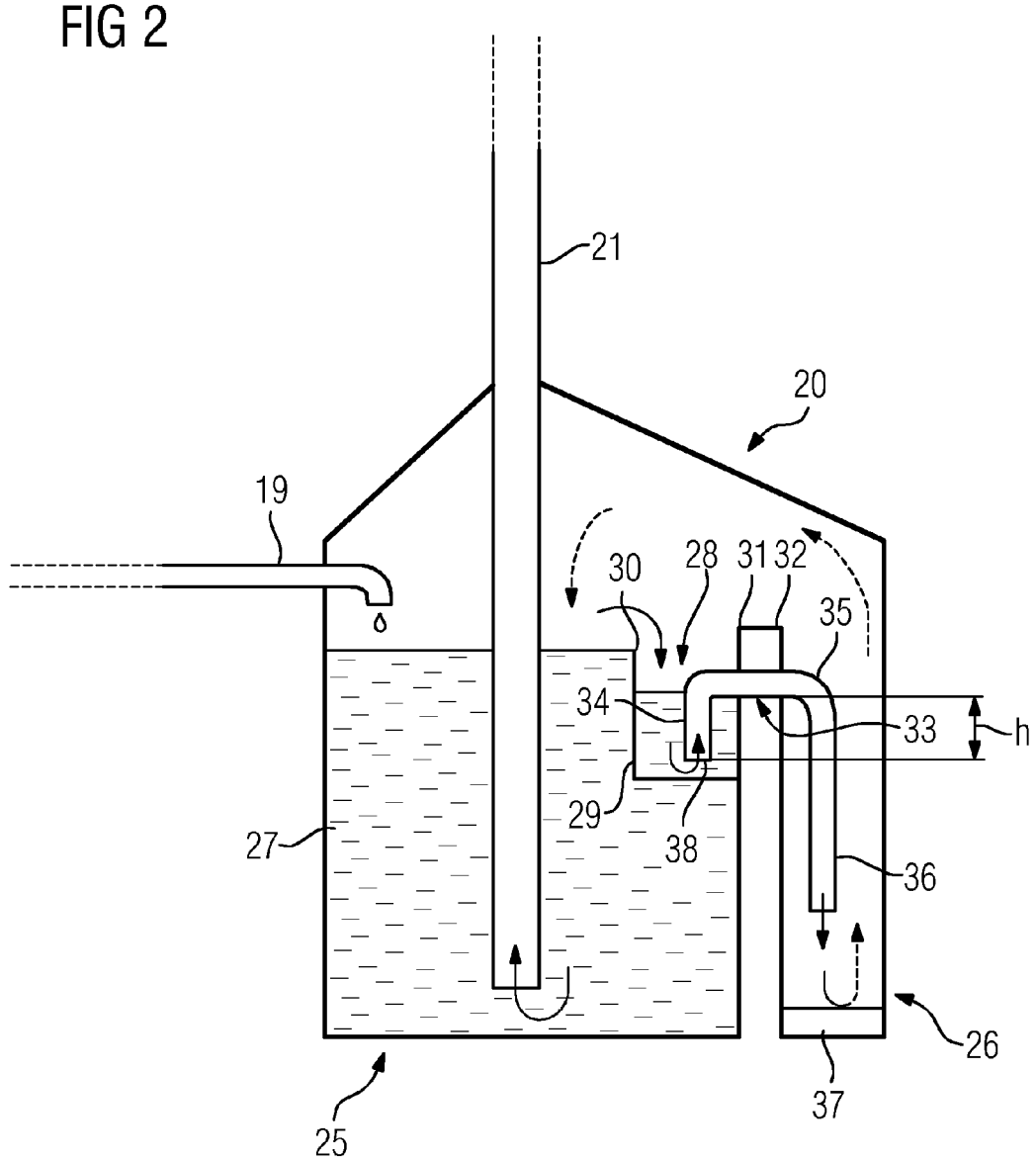
FIG. 2 shows an enlarged schematic diagram of embodiment of an the inventive device to illustrate its functional principle.

The storage vessel 20 includes two regions, namely the storage region 25 and the evaporator region 26, separated from it fluidically but still connected to it atmospherically. The pipe 21 and also the pipe 19, from which coolant flows in more or less continuously, open out into the storage region. The condensed coolant 27 collects in the storage region 25, the level rises continuously. When the fill level shown in FIG. 2 is reached, the coolant 27 flows into an overflow region 28, which is separated off by means of an overflow wall 29 within the storage region 25. This overflow wall 29 has a floor and wall sections, on the upper side the overflow region 28 is open, so that the coolant 27 can flow in over the upper edge of the overflow wall 29. The upper edge 30 of the overflow wall 29 lies in height terms below the upper edge 31 of a partition wall 32, by which the storage region 25 is separated from the evaporator region 26.

Also provided is an overflow pipe 33, which functions as a suction lift. It connects the storage region 25 or the overflow region 28 to the evaporator region 26. The U-shaped overflow pipe has a suction arm 34 which goes down into the overflow region 28. The suction arm 34 changes into a transverse arm 35, running horizontally in the example shown, which for its part changes into a vertical outlet arm 36. The transverse arm 35 runs below the upper edge 31 of the partition wall 32.

Also provided is a heat source 37 in the evaporator region 26. This heat source 37 is disposed in the example shown on the floor side of the evaporator region 26. The heating device can involve a separate, continuously-operated heating device which in the evaporator region on the floor side creates, or rather has, a temperature which lies above the boiling temperature of the coolant used 27. The heat source 37 can however also be realized using a third object which is thermally in contact with the floor of the evaporator region 26. In each case it must be ensured that the evaporator region has a corresponding heat source 37 which is higher than the boiling temperature of the coolant.

The cryogenic components are accommodated within vacuum insulation 39.

The functioning of the device 1 is to be taken from the example depicted in FIG. 2.

As described, coolant 27 flows in largely continuously via the line 19; the level of coolant in the storage region 25 rises continuously. When a level is reached which corresponds to the upper edge 30 of the overflow wall 29, coolant 27 flows into the overflow region 28, so that the coolant level also increases there over the course of time. The filling process lasts until such time as the level of the coolant located in the overflow region 28 corresponds to the apex of the overflow pipe 33, here in the example shown the lower level of the transverse arm 35. As from the time that this level is reached coolant located in the overflow region 28 is now automatically sucked out via the overflow pipe 33 functioning as a suction lifter, it flows into the evaporator region 26. This sucking-out process lasts until such time as the level has fallen again far enough for it to lie in the plane of the suction opening 38 of the suction arm 34. Then the suction process ends.

The coolant sucked out via the overflow pipe 33 flows as described into the evaporator region 26. There it strikes the heat source 37. This leads to the immediate evaporation of the coolant 27, as shown by the now dashed arrow pointing upwards from the floor of the evaporator chamber 26. This results in an overpressure being created or built up in the storage vessel as a whole, since the evaporator region 26 is connected atmospherically to the storage region 25. This overpressure bears down on the level of the coolant 27 in the storage region 25. If the overpressure is large enough, the result is that coolant 27 is pushed from below into the pipe and is conveyed via said pipe into the cavity 12 of the machine 2, where it performs its cooling effect and evaporates again. The evaporated coolant then arrives via the line 23, 24 at the condensing device 15, wherein it is condensed again and is supplied via the line 19 to the storage vessel 20 again. The level of the coolant 27 in the storage region 25 has fallen as a result of the coolant being pressed out of said region; the fall in the level depends on the amount of overpressure created.

By the continuous inflow of coolant the level again rises continuously in the storage region 25, until it is again high enough for coolant 27 to flow over the overflow wall 29 into the overflow region 28 and then the level rises again there until the level of the transverse arm 35 is reached and the next automatic suction process occurs, combined with the immediate evaporation process and the creation of the overpressure and the pressing out of the coolant via the riser line 21 into the cavity 12. A continuous, automatic cycle is thus realized, which makes possible automatic pumping of the coolant at intervals solely by creating the overpressure in the storage vessel 20.

The embodiment of the overflow region 28 via the overflow wall 29 is not absolutely necessary. It is also conceivable to suck coolant 27 directly out of the "one-piece" storage region 25. In this case the suction process would then start when the general coolant level in the storage region 25 reaches the level of the transverse arm 35. A maximum amount of coolant is sucked out until the level has again fallen to the plane of the suction opening 38. In this case a greater volume of liquid is automatically sucked out than with the embodiment in accordance with FIG. 2, where the maximum volume of liquid able to be sucked out is defined by the size of the overflow area in conjunction with the height h between the plane of the suction opening 38 and the level of the transverse arm 35. As a rule however a relatively small sucked-out volume is adequate in order to create a sufficient overpressure (as a rule an overpressure ≥0.1 bar is sufficient).

A further advantage of the embodiment with the overflow area 28 shown in FIG. 2 lies in the fact that this system is relatively insensitive to slight tiltings of the storage vessel 20, as can occur if the machine 2 is being transported on ships or operated on off-shore facilities. In this case, because of the movement of the ship or of the offshore facility, there can be oscillations and displacements of the device 1, but the respective level of the coolant 27 always remains in the horizontal. If no overflow region 28 is provided, such tilting can lead to the level in the area of the suction arm 34 falling considerably because of the tilting, and thus a suction process, since the level of the transverse arm 35 or of the apex then to be considered is not reached, not starting for some considerable time, even if from the fill amount in relation to the horizontal initial position there were sufficient coolant 27 in the storage region 25. This means that such movement can readily have an effect on the automatic suction process and thus on the conveyance of the coolant 27 to the cavity 12, changes in position thus have a possible influence.

If however an overflow region 28 is provided, then this is almost to be seen as a separate system. Since it is relatively small, such oscillations only have a marginal effect. Any height difference which would to all intents and purposes cause a relative fall in level in the area of the suction opening cannot occur, which is why consequently any changes in position of the overall arrangement do not have any effect on the automatic suction process via the overflow pipe functioning as a suction lifter and thus also on the evaporation process and coolant conveyance process resulting therefrom. The system is consequently extremely stable, as is also, as a result thereof, the operation of the machine 2.

Although the invention has been illustrated and described in greater detail by the preferred example embodiment, the invention is not restricted by the disclosed examples and other variations can be derived therefrom by the person skilled in the art, without departing from the scope of protection of the invention.

The invention claimed is:

1. A device for cooling a superconducting machine, comprising:
    a single storage tank having a continuous outer peripheral wall and accommodating a condensed coolant, from which the coolant is able to be supplied via a riser pipe connected to the superconducting machine, the storage vessel including
    a storage region within the storage tank,
    an evaporator region within the storage tank and separated from the storage region, the evaporator region including a heat source to provide a temperature continuously above the boiling temperature of the coolant, and
    a curved overflow pipe connecting the evaporator region to the storage region such that, when a coolant fill level in the storage region is reached, coolant flows automatically via the overflow pipe into the evaporator region to evaporate therein.

2. The device of claim 1, wherein the overflow pipe is curved in a U shape and includes a suction arm disposed in the storage region, an outlet arm disposed in the evaporator region and a transverse arm between the suction arm and the outlet arm.

3. The device of claim 1, wherein an apex of the overflow pipe lies below an upper edge of a partition wall separating the storage region from the evaporator region.

4. The device of claim 3, wherein a distance in height terms between a suction opening of the suction arm and the apex amounts to at least one centimeter.

5. The device of claim 1, wherein, in the storage region, an overflow region is separated off by way of an overflow wall, into which coolant overflows and from which, when the fill level is reached, coolant runs via the overflow pipe into the evaporator region.

6. The device of claim 1, wherein the heat source is a heater.

7. The device of claim 1, wherein the heat source is a wall surface which, in an installation position, is in thermal contact with a third object having a temperature lying above the boiling temperature of the coolant.

8. The device of claim 1, wherein a number of storage vessels are provided, pipes of the storage devices being designed as riser lines routed separately to the superconducting machine, or as riser lines which open out into a common supply line running to the superconducting machine.

9. The device of claim 8, wherein each of the storage vessels is assigned a separate condenser device for condensing the gaseous coolant coming from the superconducting machine, or wherein each of the storage vessels are assigned a common condenser device.

10. The device of claim 1, wherein the coolant is conveyed in the riser pipe against the force of gravity.

11. The device of claim 2, wherein an apex of the overflow pipe lies below an upper edge of a partition wall separating the storage region from the evaporator region.

12. The device of claim 3, wherein a distance in height terms between a suction opening of the suction arm and the apex amounts to several centimeters.

13. The device of claim 2, wherein, in the storage region, an overflow region is separated off by way of an overflow wall, into which coolant overflows and from which, when the fill level is reached, coolant runs via the overflow pipe into the evaporator region.

14. The device of claim 4, wherein, in the storage region, an overflow region is separated off by way of an overflow wall, into which coolant overflows and from which, when the fill level is reached, coolant runs via the overflow pipe into the evaporator region.

15. The device of claim 6, wherein the heat source is a resistive heater.

16. The device of claim 7, wherein the heat source is a floor surface of the evaporator region.

17. The device of claim 1, wherein the storage region, the evaporator region and the overflow pipe are housed within the storage vessel.

* * * * *